United States Patent
Rallo et al.

(10) Patent No.: US 7,574,405 B2
(45) Date of Patent: Aug. 11, 2009

(54) APPARATUS AND METHOD FOR VERIFYING SOURCE OF FUNDS REGARDING FINANCIAL TRANSACTIONS

(75) Inventors: Elizabeth K. Rallo, Easton, CT (US); Jane Kilduff Alpert, Stamford, CT (US); Antonio Masone, Wilton, CT (US); Chris L. Gougler, Coppell, TX (US)

(73) Assignee: General Electric Captical Corporation, Stamford, CT (US)

( * ) Notice: Subject to any disclaimer, the term of this patent is extended or adjusted under 35 U.S.C. 154(b) by 391 days.

(21) Appl. No.: 11/021,794

(22) Filed: Dec. 23, 2004

(65) Prior Publication Data

US 2006/0143123 A1     Jun. 29, 2006

(51) Int. Cl.
*G06Q 40/00*    (2006.01)
(52) U.S. Cl. ......................................... 705/44; 705/39
(58) Field of Classification Search .............. 705/10–44
See application file for complete search history.

(56) References Cited

U.S. PATENT DOCUMENTS

| 4,321,672 | A | * | 3/1982 | Braun et al. | 705/42 |
| 6,044,362 | A | * | 3/2000 | Neely | 705/34 |
| 6,721,716 | B1 | * | 4/2004 | Gross | 705/40 |

* cited by examiner

*Primary Examiner*—Frantzy Poinvil
(74) *Attorney, Agent, or Firm*—Buckley, Maschoff & Talwalkar LLC

(57) ABSTRACT

A system, method, apparatus, means, and computer program code that facilitate verification of a source of funds for payment to an account, including receiving payment information associated with the account for a payment to the account, receiving an indication of a payment for the account, the indication including a source of funds for the payment, determining that the source of funds for the payment is an approved source of funds, and providing, in the instance the source of funds for the payment is not an approved source of funds, a notification via electronic communication.

14 Claims, 8 Drawing Sheets

APPARATUS AND METHOD FOR VERIFYING SOURCE OF FUNDS REGARDING FINANCIAL TRANSACTIONS

FIELD OF THE INVENTION

The present invention relates to a method, apparatus, and article for facilitating verification of a source of funds for payment to an account.

BACKGROUND OF THE INVENTION

In an effort to effectuate a number of economic and legal objectives, a need to determine a source of funds for certain financial payments has developed. The aspect of determining the source of funds for a financial payment may comprise an asset management system or tool Thus, in the context of, for example, an organization that administers to a large number of accounts and receives payments for those many accounts, there may exist a need to verify a source of funds in compliance with applicable regulations and internal policies.

Accordingly, there exists a need to efficiently determine and verify a source of funds regarding incoming payments to an account.

SUMMARY OF THE INVENTION

Some embodiments of the present disclosure provide a system, method, apparatus, means, and article for facilitating verification of a source of funds for payment on an account. A method for facilitating verification of a source of funds for payment to an account may include, receiving payment information associated with the account for a payment to the account and receiving an indication of a payment for the account. The indication may include a source of funds for the payment. The method may further include determining that the source of funds for the payment is an approved source of funds, and providing, at least in an instance the source of funds for the payment is not an approved source of funds, a notification via electronic communication to a designated person.

An entity may receive payment information associated with the account for a payment to the account. The entity may also receive an indication of a payment to be applied towards the account, the indication including a source of funds for the payment. The entity may further verify that the source of funds for the payment is an approved source of funds. At least in an instance where the source of funds for the payment is not an approved source of funds, a notification of such may be provided via electronic communication to an interested entity.

Additional objects, advantages, and novel features of the invention shall be set forth in part in the description that follows, and in part will become apparent to those skilled in the art upon examination of the following or may be learned by the practice of the invention.

BRIEF DESCRIPTION OF THE DRAWINGS

The accompanying drawings, which are incorporated herein and form a part of the specification, illustrate some embodiments of the present disclosure, and together with the descriptions serve to explain the principles thereof.

DETAILED DESCRIPTION

Applicants have recognized that there is a need for systems, means, computer code and methods that facilitate verification of a source of funds intended for payment to an account. The account may be related to one or more types of accounts, such as, for example, a mortgage loan, a line of credit account, a revolving credit account, etc. In particular, applicants have recognized that there is a need for systems, means, computer code and methods for allowing payments to be processed for customers by a source of funds (SOFUN) verifier, for determining whether a source of funds intended for payment to an account is drawn from an acceptable source of funds for the account and notifying an administrator or owner of the account, at least, in an instance the source of funds are determined be from a-prohibited source. One technical effect obtained by such systems, methods, etc. is that information regarding a source of funds is provided in an efficient and effective manner. These and other features will be discussed in further detail below, by describing a system, individual devices, and processes according to embodiments of the invention.

Figure 1:
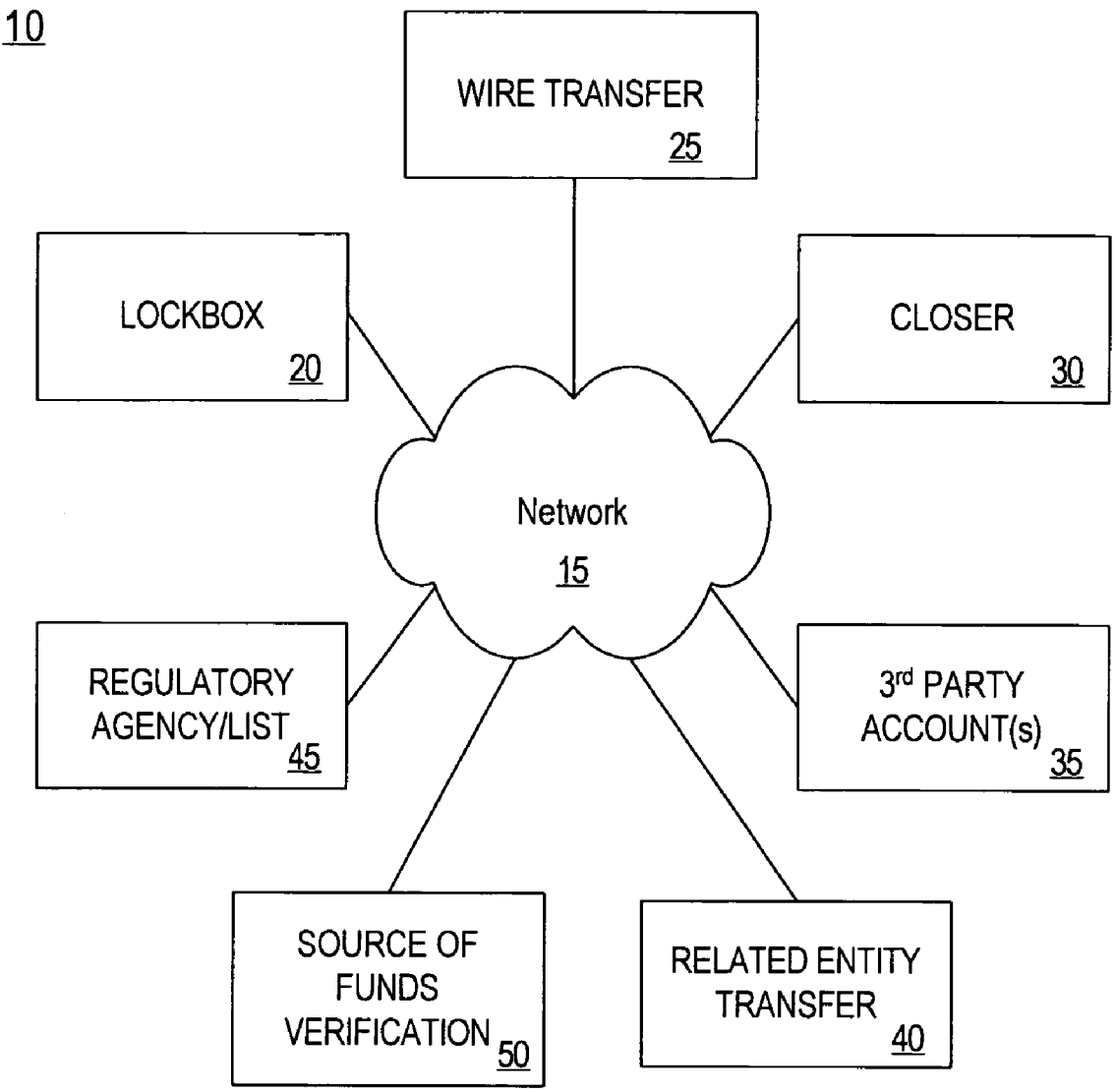
FIG. 1 is an exemplary block diagram illustrating a system environment for some embodiments herein.

Referring to FIG. 1, an exemplary system 10 depicting a context or environment suitable for some embodiments herein is illustrated. System 10 includes a source of funds (SOFUN) verifier 50. SOFUN verifier 50 may be in communication or interfaced with one or more other entities via a network 15. SOFUN verifier 50 may be in communication or interfaced with a number of payment mechanisms such as, for example, banking lockbox account 20, wire transfer account 25, one or more entities that have information related to the creation of an account such as, for example, deal originator or closer 30, and third party account 35. SOFUN verifier 50 may be in communication or interfaced with an entity related to (e.g., a subsidiary, a joint venture partner, a division, etc.) an entity for which SOFUN verifier 50 is performing its verification processing. The related entity information may be provided by the communication link to related entity transfer 40. In some embodiments herein, SOFUN verifier 50 may desire communication with an organization or agency (i.e., an entity) that supplies, generates, updates, monitors, or otherwise provides a listing or access to approved, prohibited, or a combination of approved and prohibited countries, individuals, and organizations regarding a source of funds.

In some embodiments, SOFUN verifier 50 may be varied or adapted to meet the particular needs of a specific source of funds verification process. The responsibilities and functionality of SOFUN verifier 50 may be varied to include all or only certain aspects of verifying a source of funds. The scope of responsibility or functionality assigned to any SOFUN verifier 50 may be based, at least in part, on a type of account for which intended payments of funds are to be verified, an amount of a payment, a category of a payment, etc.

SOFUN verifier 50 may communicate directly or indirectly with lockbox bank account 20, wire transfer account 25, closer 30, third party account 35, related entity transfer 40, and regulatory agency/list 45.

SOFUN verifier 50 may include, use or comprise a single device or computer, a networked set or group of devices or computers, a workstation, etc. In some embodiments, SOFUN verifier 50 may implement or host a Web site, database, or other electronically accessible resource for purposes of implementing some embodiments described herein and for providing verification information.

Figure 2:
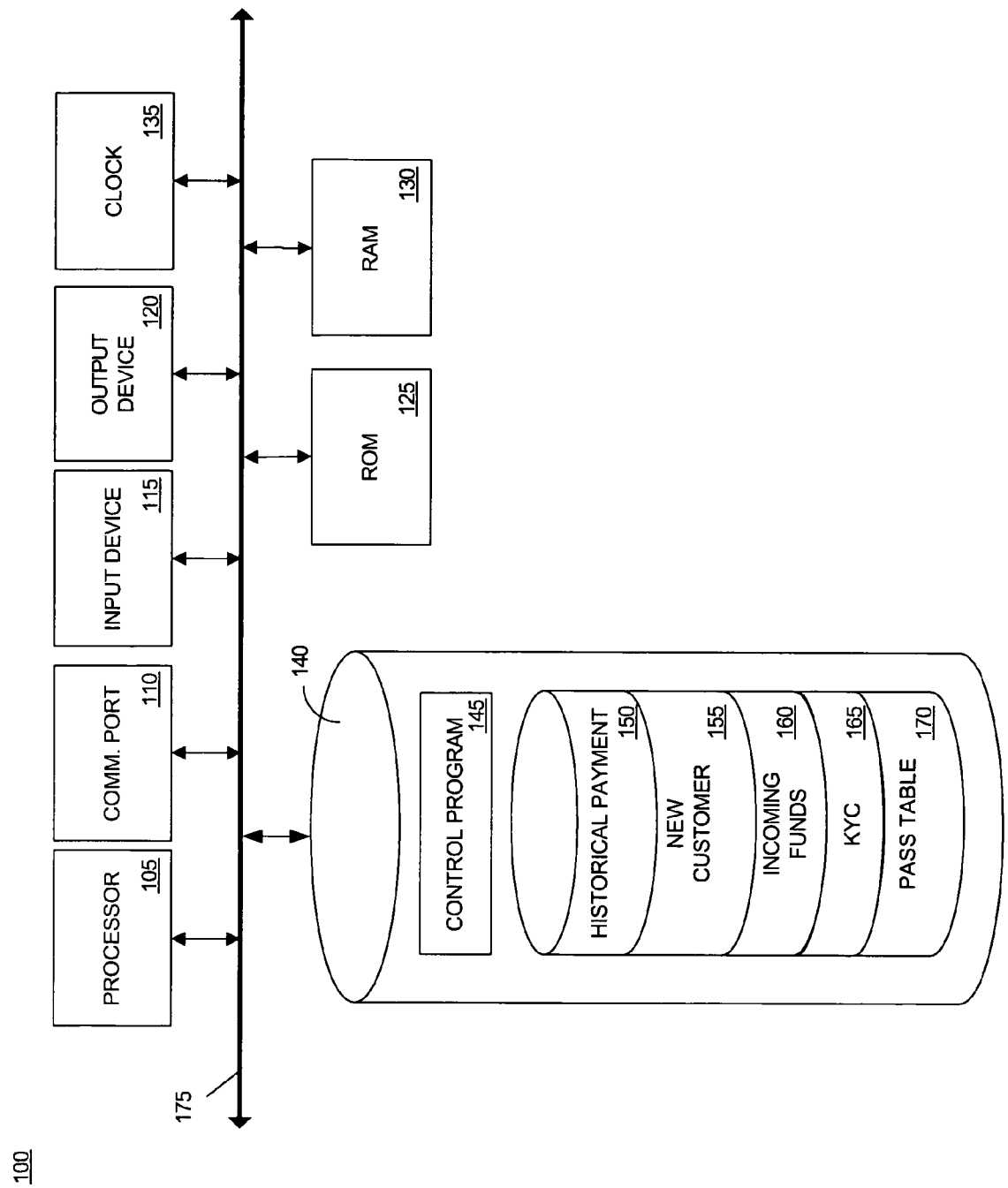
FIG. 2 is an illustrative depiction of an apparatus, in accordance with some embodiments herein.

Referring to FIG. 2, a representative block diagram of a device that may be used by SOFUN verifier 50 is illustrated, generally represented by reference number 100. Device 100 may include a processor, a microchip, a central processing unit, or a computer 105 that is in communication with or otherwise uses or includes one or more communication ports 110 for communicating with other devices. Communication ports 110 may include, for example, local area network adapters, wireless communication devices, Bluetooth® technology, etc. to provide an interface to, for example, network 15.

In some embodiments, device 100 may include one or more input devices 115 (e.g., a bar code reader or other optical scanner, infrared or other receiver, antenna, magnetic stripe reader, image scanner, roller ball, touch pad, joystick, touch screen, microphone, computer keyboard, computer mouse, etc.), as well as one or more output devices 120 (e.g., a printer, infrared or other transmitter, antenna, audio speaker, display screen or monitor, text to speech converter, etc.). Device 100 may include Random Read-Only Memory (ROM) 125 and Random Access Memory (RAM) 130.

In some embodiments, device 100 acts as a server or at least includes functionality of a server for facilitating a source of funds verification functionality, in accordance with various aspects of the disclosure herein. Device 100 may include a memory or data storage device 140 to store information, software, databases, communications, device drivers, reports, inquiries, service requests, etc. Memory or data storage device 140 preferably comprises an appropriate combination of magnetic, optical and/or semiconductor memory, and may include, for example, ROM, RAM, a tape drive, flash memory, a floppy disk drive, a compact disc and/or a hard disk, etc.

Processor 105 and data storage device 140 may each be, for example, located entirely within a single computer or other computing device, or connected to each other by a remote communication medium, such as a serial port cable, telephone line, or radio frequency transceiver. In some embodiments, device 100 may include or comprise one or more computers that are connected to a remote server computer for maintaining databases or may maintain and control databases such as, for example, a historical payment database 150, a new customer database 155, an incoming funds database 160, a know your customer (KYC) database 165, and a pass table database 170.

In some embodiments, a conventional personal computer or workstation with sufficient memory and processing capability may be used as device 100. In some embodiments, device 100 may provide, host, operate, or implement an electronically accessible resource. For example, device 100 may operate as or include a Web site or database server for an Internet environment. The Web site or database may be accessible to client customers of the owner/operator entity of device 100. For example, client customers may include, for example, banks, credit account issuers, mortgage companies, loan servicing companies, municipalities, etc.

In some embodiments, device 100 is capable of high volume transaction processing, performing a significant number of mathematical calculations in processing communications and database searches. In some embodiments, processor 105 may comprise one or more microprocessors, computers, computer systems, co-processors, etc.

Software may be resident and operating or operational on device 100. The software may be stored on the data storage device 140 and may include a control program 145 for operating device 100, databases, etc. Control program 145 may control processor 105. Processor 105 preferably performs instructions of control program 145, and thereby to operate in accordance with the present disclosure, and particularly in accordance with the methods described herein. Control program 145 may be stored in a compressed, uncompiled and/or encrypted format. Control program 145 may include program elements that may be needed, such as an operating system, a database management system, and device drivers, for allowing processor 105 to interface with peripheral devices, databases, etc. Appropriate program elements are known to those skilled in the art, and need not be described in detail herein.

Device 100 may include or store information regarding accounts, payments, customers, approved payees, approved accounts, rules, regulations, prohibited countries and individuals, etc. in a number of databases. For example, historical payment information regarding one or more accounts may be stored in historical payment database 145 for use by device 100 or another device or entity. Information regarding one or more new customers may be stored in new customer database 155 for use by device 100 or another device or entity. Information regarding one or more incoming payments may be stored in incoming funds database 160 for use by device 100 or another device or entity. Know your customer, KYC, data regarding one or more account customers may be stored in KYC database 165 for use by device 100 or another device or entity, and information regarding one or more entities (e.g., companies, countries, individuals, organizations, etc.) pre-approved for trading and transferring of funds may be stored in pass table database 170. In some embodiments, some or all of the databases may be stored or mirrored remotely from device 100.

According to some embodiments of the present disclosure, instructions of control program 145 may be read into a main memory from another computer-readable medium, such as from ROM 125 to RAM 130. Execution of sequences of the instructions in the control program causes processor 105 to perform the process steps described herein. In some embodiments, hard-wired circuitry may be used in place of, or in combination with, software instructions for implementation of some or all of the methods of the present disclosure. Thus, the various embodiments herein are not limited to any specific combination of hardware and software.

Processor 105, communication port 110, input device 115, output device 120, ROM 125, RAM 130, clock 135, and data storage device 140 may communicate or be connected, directly or indirectly, in a variety of ways. For example, processor 105, communication port 110, input device 115, output device 120, ROM 125, RAM 130, clock 135, and data storage device 140 may be connected via a bus 175.

While specific implementations and hardware configurations for device 100 have been illustrated, it should be noted that other implementations and hardware configurations are possible and that no specific implementation or hardware configuration is required. Thus, not all of the components illustrated in FIG. 2 may be needed for or included in a device implementing the methods disclosed herein. Therefore, many different types of implementations or hardware configurations can be used in system 100 and the methods disclosed herein are not limited to any specific hardware configuration.

Figure 3:
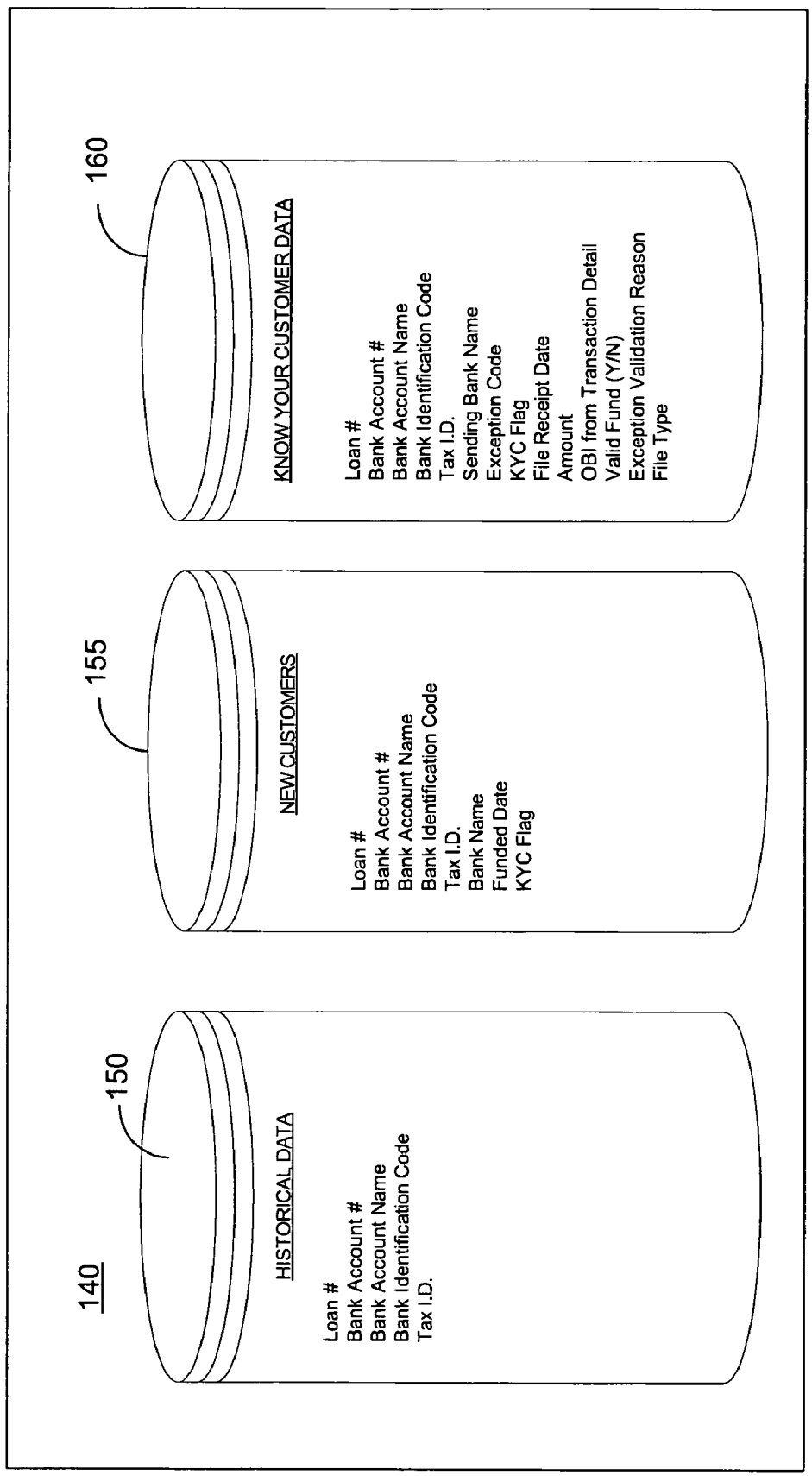
FIG. 3 is an exemplary illustration of a number of databases of FIG. 2.

A number of databases 150, 155, and 160 are depicted in FIG. 3. As mentioned above, in some embodiments herein a SOFUN verifier or other device or entity may access a storage device (e.g., storage device 140) that may include one or more databases for storing or keeping information regarding payments and payment information related to an account.

Historical data database 150 may include payment information related to an existing account. In particular, historical data database 150 may provide account identifying information that, preferably, differentiates one account from another account. For example, historical data database 150 may include a code, field, or other identifier representative of a loan number, a bank account number, a bank account name, a bank identification code, and a tax identifier of an entity associated with the payment information. These various codes, fields, or identifiers preferably contain sufficient criteria for identifying unique accounts, including sufficient information for the source of payment methods disclosed herein. In some embodiments, historical data database 150 will include an indicator that the payment information for each account in the database is valid (i.e., approved) regarding the source of funds for historical (i.e., prior) payments to the account. In some embodiments, the fact that the account is included in historical data database 150 in an indication that the payment information for each account in database 150 is valid.

New customer database 155 may include payment information related to an account for which no historical data exists, such as a new customer or a newly acquired account. New customer database 155 may provide account identifying information that, preferably, differentiates one account from another account. Since the accounts referenced in new customer database 155 have no historical payment information associated therewith, new customer database 155 may typically include more account representative fields, codes, or other identifiers, as compared to historical data database 150. Accordingly, for example, new customer database 155 may include a code, field, or other identifier representative of a loan number, a bank account number, a bank account name, a bank identification code, a tax identifier, a funded date indicative of when the account was funded, and a Know your customer (KYC) flag that indicates the status of the account relative to a know your customer verification process. In some embodiments, the code, fields, or identifiers populating new customer database 155 may be obtained from, for example, closer 30, third party account 35, and related entity transfer 40.

KYC database 160 may include payment information related to an account, including an indication of the result of a KYC check and a SOFUN verification process, in accordance with some embodiments herein. KYC database 160 may include or be populated by some codes, fields, or other identifiers similar to those included in historical data database 150 and new customer database 155. In some embodiments herein, KYC database 160 is an aggregation of account information, whether historical account information from historical data database 150 or new customer account information from new customer database 155. In some embodiments, the SOFUN verification processes and methods herein may compare an indication of incoming payment information to the code, fields, or other identifiers in KYC database 160.

In some embodiments, the particular codes, fields, and identifiers disclosed herein and related to each account in the databases may include more or less codes, fields, and identifiers associated with an account than those provided by example herein. For example, for a new customer account referenced in new customer database 155, there may be a code, field, or identifier that indicates whether the new customer account information is valid regarding a KYC check. That is, a KYC check may be performed for a new account and an indication of the result of that KYC check may be included in the news customer database 155. In some embodiments herein, a KYC check is performed as part of or concurrently with the creation of a new account or closing of a new account.

Figure 4:
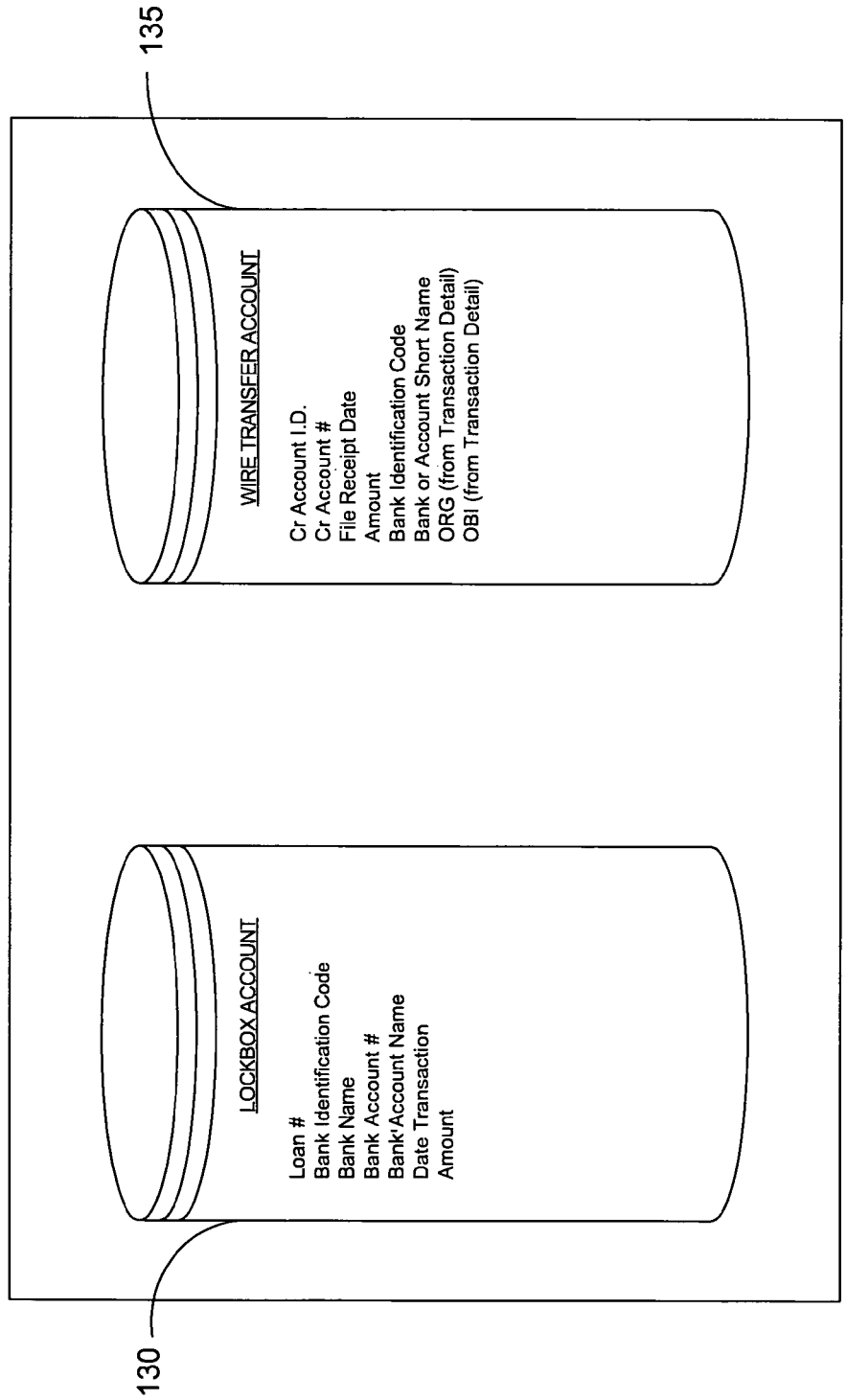
FIG. 4 is an exemplary illustration of an incoming funds database of FIG. 2.

FIG. 4 shows a number of exemplary databases, including lockbox account database 130 and wire transfer account database 135. Databases 130 and 135 are but two of a number of accounts or stores of incoming payment information or incoming funds. Accounts and stores of incoming funds, such as those referenced in lockbox account database 130 and wire account database 135 may provide an indication of a payment that is intended to be applied to an account.

Lockbox account 130 may include payment information received from a banking lockbox account. Accordingly, a SOFUN verifier in accordance with the methods herein may be interfaced with a lockbox account provider, such as a bank. Lockbox account 130 may include payment information including an indication of a payment for an account. In some embodiments herein, lockbox account 130 may include or be populated by code, fields, or other identifiers such as, for example, a loan number, a bank account number, a bank account name, a bank identification code, a tax identifier, a name of the bank from which the incoming funds will be drawn against, a date for the payment transaction, and an amount of the payment intended to be applied to the account.

Wire transfer database 135 may include payment information received from a wire transfer account. A SOFUN verifier in accordance with the methods herein may be interfaced with a wire transfer account provider, such as a bank or other financial institution. Wire transfer account database 135 may include payment information including an indication of a payment for an account. In some embodiments herein, wire transfer account 135 may include or be populated by codes fields, or other identifiers such as, for example, a file receipt date, a transaction detail, a credit account identifier, and a credit account number. The transaction detail code, field, or identifier may be examined or parsed to extract additional information such as, for example, a bank identification code, a bank or account name, a loan number, a sending bank name, and an amount of the wire transfer payment intended to be applied to the account.

In some embodiments, the wire transfer account information may not explicitly include the account number or loan number for which the transferred funds are to be applied. Accordingly, the transaction detail information of the wire transfer account information may be examined for such additional information, including any processing thereof required to extract the desired information.

In some embodiments herein, incoming payment information such as, for example, lockbox account information and wire transfer account information may be received by a SOFUN verifier herein at a pre-determined time interval. The incoming payment information may be received, gathered, accessed, or otherwise provided, for example, for SOFUN verification once every twenty-four hours, every eight hours, in real-time, etc.

The lockbox account information may be included in a file (e.g., a batch file) and transferred to a SOFUN verifier in accordance herewith by file transfer protocol (ftp) once every twenty-four hours. It is noted that other data transfer protocols may be used without limitation hereon. In some embodiments, file transfers may include, incorporate, or otherwise make use of security mechanisms to protect the security of the information that is transferred in a performance of the methods disclosed herein. Security mechanism can include, for example, encryption and decryption techniques.

In some embodiments, incoming payment information received by the SOFUN verifier is compared to the payment information referenced or stored in, for example, historical data database 150, new customer database 155, and KYC database 160. The comparison may be made to determine, inter alia, whether there is agreement between the incoming funds payment information and the payment information on file (i.e., historical payment data and new customer payment information provided during a creation or acquisition of an account).

These various codes, fields, or identifiers preferably contain sufficient criteria for identifying unique accounts, including sufficient information regarding the source of payment methods disclosed herein. In some embodiments, historical data database 150 will include an indicator that the payment information for each account in the database is valid (i.e., approved) regarding the source of funds for prior payments to the account. In some embodiments, the fact that the account is included in historical data database 150 in an indication that the payment information for each account in database 150 is valid.

Figure 5:
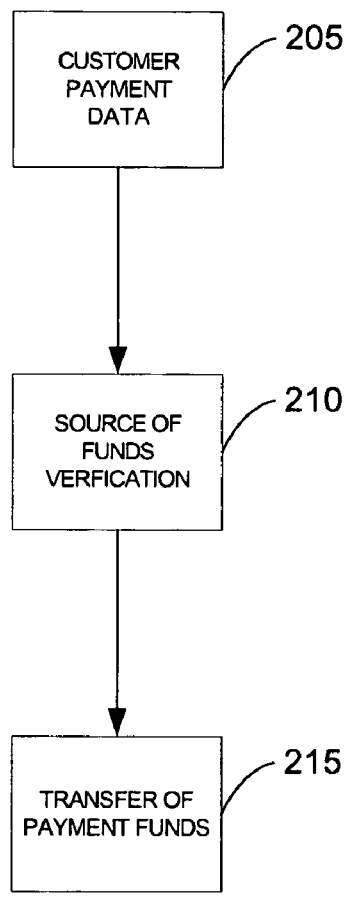
FIG. 5 is an exemplary flow diagram of an overall process, in accordance with some embodiments herein.

Referring to FIG. 5, an exemplary process 200, in accordance with some embodiments of the present disclosure, is illustrated. Process 200 includes obtaining, receiving, generating, or otherwise accessing payment data at 205. The payment data may be received via network 15, either directly or indirectly, directly from a source of payments such as, for example, lockbox account 20, wire transfer account 25, closer 30, third party account 35, related entity transfer 40, combinations thereof, and any other payment data provider.

An indication of a payment from any one of payment data providers at 205 is received at a source of funds (SOFUN) verifier at operation 210. In some embodiments, the SOFUN verifier at operation 210 is similar to the exemplary SOFUN verifiers 50 and 100 depicted in FIGS. 1 and 2, respectively. However, as stated herein regarding FIGS. 1 and 2, the particular implementation of SOFUN verifier used at 210 may be varied, depending, at least, on a responsibility and function of the SOFUN verifier.

In some aspects herein, the SOFUN verifier at 110 operates to verify a source of funds for the payment information obtained, received, generated, accessed, or otherwise provided at 105. The determination and verification of the source of the funds may be undertaken as a voluntary measure, or in the alternative, may be required to satisfy any number of rules, regulations, laws, treaties, mandates, policies, etc.

Upon completion of a verification of the source of the funds in accordance with the methods herein, the funds intended for payment to the account are further processed or transferred to complete the account payment process, as indicated at 215. The transfer of payment funds at operation 215 does not solely refer to a physical exchange of funds. Transfer of payment funds at 215 operation may, more generally, include any process or portion of a process that includes processing of a payment to an account, concurrently or subsequent to the verification of the source of funds process, to further complete the account payment process.

Figure 6:
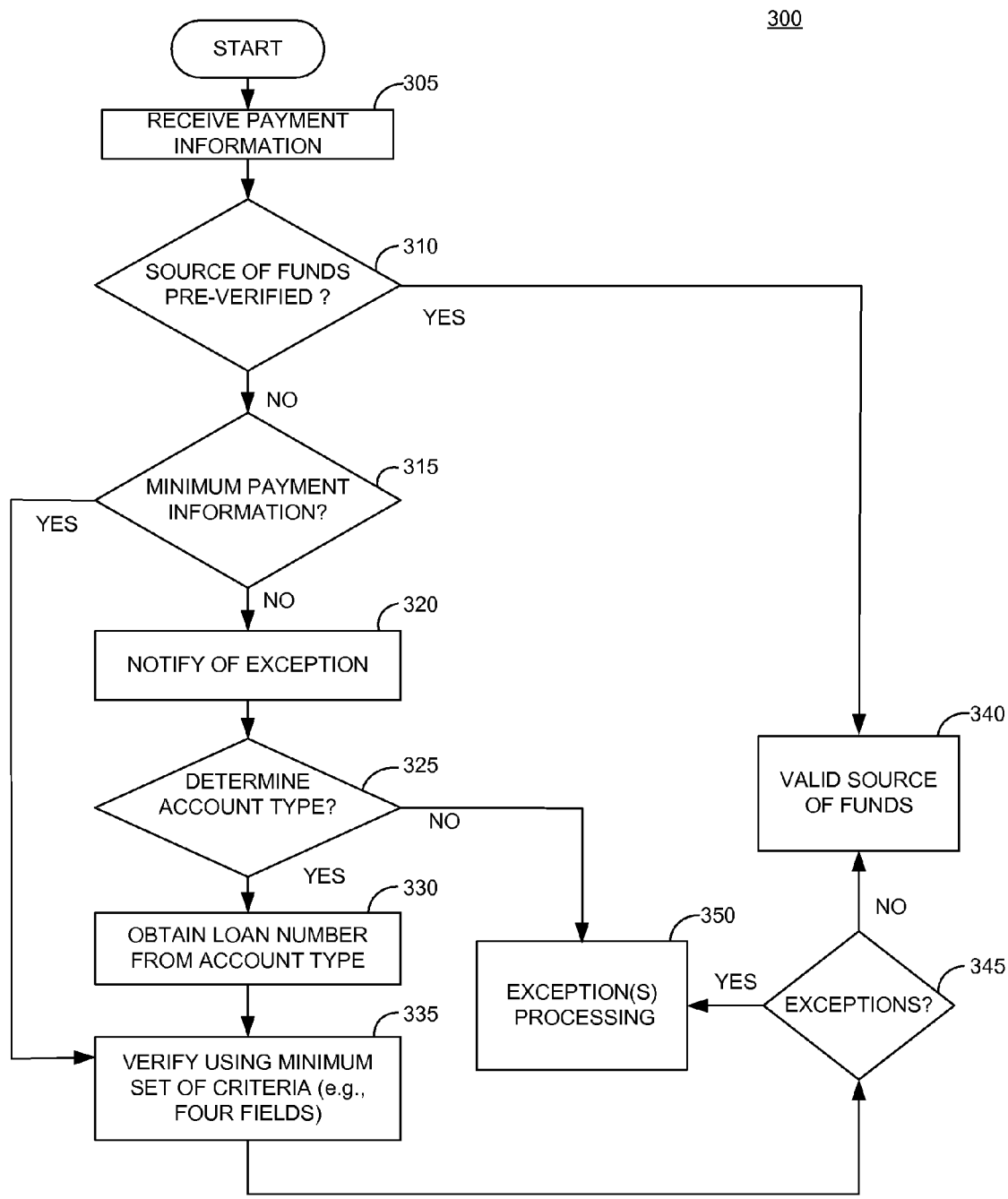
FIG. 6 is a flowchart of a process of verifying a source of funds, in accordance with some embodiments herein.

FIG. 6 shows an exemplary flow diagram of a process 300 for verifying a source of funds for a payment, according to some embodiments herein. Process 300 initially starts at 305 with a receipt of payment information. The payment information may be from a number of sources, including lockbox account 20, wire transfer 25, closer 30, etc. The payment information preferably includes sufficient codes, fields, or identifiers to indicate a source of funds for the received payment information.

At 310 a first determination is made to determine whether the payment information is valid regarding a source of funds associated therewith. The determination determines whether the source of funds for the received payment information is pre-verified or otherwise from a predetermined, approved source of funds. The pre-verified or approved source of funds may be contained in a data store such as, for example, pass table database 170 depicted in FIG. 2. Pass table database 170 may include a number of codes, fields, and identifiers that reference pre-verified or approved sources of funds. The codes, fields, and identifiers may include information such as, for example, a bank account name, a valid date or range of valid dates for the pre-verified, approved SOFUN, an indication of an entity that authorized the SOFUN as pre-verified, and additional information that may further authenticate the pre-verified SOFUN payment information. The pass table may include additional information such as, for example, an indication the pass table is current, the date the pass table entry was created, who created the pass table entry, and when the pass table entry was last updated and by whom. Pass table database 170 may contain entries therein in a table. However, pass table database 170 entries may be organized in one or more alternative formats.

In some embodiments, access, creation, and editing of pass table database 170 may be limited by security safeguards. Such security safeguards may include encryption and associated key(s), passwords, and pass codes, and other security techniques.

In some embodiments herein, a source of funds associated with an organization or entity referenced in pass table database 170 is considered to be valid. For example, a known organization referenced in pass table database 170 may be valid. A known organization that may be included in pass table database 170 may include a related entity such as a division or subsidiary, or joint venture partner of the entity for whom the SOFUN verification is performed.

In the instance it is determined that the source of funds is pre-verified at 310, then process 300 proceeds to indicate or validate the source of funds at 340. That is, the source of funds is deemed valid, from an approved source. An indication that the source of funds is approved may be provided to an entity via a reporting mechanism such as, for example, an email message, a stored or printed report, a display, an identification that the source of funds is pre-verified, etc.

In the instance that the determination of 310 determines that the source of funds is not pre-verified, process 300 proceeds to operation 315. At 315, a determination is made whether the payment information includes a minimum of identifying payment information. The minimum payment information may include such items as, for example, a loan number for the account to which the received payment information pertains. That is, does the received payment information include the loan number of the account for which the received payment will be applied against? If the minimum payment information is not present in the received payment information, then process 300 proceeds to provide a notification of such at 320. If the minimum payment information is present in the received payment information, then process 300 proceeds to verify the payment information.

At 325, an attempt is made to ascertain the minimum payment information necessary for SOFUN verification although such information was not received with the payment information at 305. For example, if the type of account (e.g., loan type) can be determined from the received payment information, then the particular loan number may be obtained from an appropriate data store. In an instance the determination of 325 determines that the type of account is not a type for which the minimum payment information can be determined, an exception to SOFUN verification process 300 is generated and process 300 proceeds to exception processing 350. Exception processing 350 represents an exception processing operation.

In an instance that it is determined at 325 that the type of account is a type for which the minimum payment information can be determined, then process 300 proceeds to obtain the minimum payment information (e.g., loan number) from the appropriate source at 330.

Having obtained the minimum payment information (e.g., loan number) from the appropriate source at 330, the source of the funds for the payment is verified using a minimum set of criteria at 335. Operation 335 is a second determination to determine whether the received payment information is valid regarding the SOFUN verification process. The minimum set of criteria may include, for example, a loan number, a bank identification number, a bank account number and a bank account name. The minimum set of criteria preferably provides sufficient information to uniquely and completely identify the source of funds of the associated payment information. The set of minimum criteria may be augmented or changed depending on, for example, a regulation, rule, law, or recommendation regarding the industry, scope, or context of application for process 300. It should thus be appreciated by those skilled in the relevant art that the minimum set of criteria may include one or more criteria different than the exemplary four discussed above.

At operation 345, a determination is made whether the verification of the source of funds using the minimum set of criteria at 335 resulted in an exception to verification process 300. If an exception to verification process is determined to have occurred at 345, then process 300 proceeds to exception processing 350. Exception processing 350 represents an exception processing operation that will be discussed in greater detail below. If it is determined that an exception to the verification process did not occur, then process 300 proceeds to indicate or validate that the source of funds for the received payment information is valid at 340.

Thus, in accordance with some embodiments herein, process 300 provides a method to verify a source of funds for a payment received for payment to an account. In the event that process 300 does not verify that the source of funds is valid (i.e., approved), processes 300 provides exception processing to further process or facilitate the reporting of the exception. The exception processing may include, in some embodiments herein, reporting and characterizing the exception.

Regarding exceptions processing operation 350, a number of reports may be generated to report or provide an indication of, for example, the type and number of exceptions generated by process 300. The exception reports may provide a historical perspective of exceptions generated during, for example, a specific time frame (e.g., a certain date), or of a particular type of exception.

An exception report may be of a variety of general types. For example, an exception summary report may be generated to provide a summery of the various types of exceptions received on a specified date. The exception summary may provide an indication of the type of exception (e.g., represented by a alpha-numeric code), a date the exception was generated, an amount of the payment to which the exception references, and a type of file (e.g., lockbox account, wire transfer account, etc.) the exception references.

Another type of exception report that may be provided herein is a report that provides an indication of a pass/fail ratio regarding a number of processed payments for the SOFUN verification process. This type of report is referred to herein as a fund summary. The fund summary report characterizes valid payment information that does not result in the generation of an exception at operation 345 (i.e., a "pass"). The fund summary report may provide, for example, an indication of the number payments that pass, a percentage of the payments that pass, a date the exception was generated, an amount of the payment to which the exception references, and a type of file the exception references.

Regarding the payments that are validated as being valid at operation 340, a report may be generated to provide an indication of the criteria used to determine the valid status of the payment. For example, the minimum set of criteria used to establish the validity of the source of funds at operation 335 may be provided in a report, generally referred to herein as a valid combinations report. The valid combinations report may thus include the set of minimum (or other) criteria used to determine the validity of the source of funds. Referring to the example hereinabove, the valid combinations report may include a listing or indication of the loan number, bank account number, bank account name, and bank identification number for the payments having a valid source of funds.

In some embodiments herein, other types of reports may be provided. For example, a pre-verified report may provide an indication of criteria that, if included in the payment information, represents the source of funds for the payment is from a pre-verified source at operation 310. Such a report may include codes, fields, or other indicators regarding the information included in pass table database 170.

It should be appreciated by one skilled in the relevant art that the exception reports herein may be organized, filtered, presented, searched, and stored in a variety of ways without departing from the scope of the present disclosure.

Regarding exception reporting herein, notification of an exception to the SOFUN verification process (e.g., process 300) may be provided to an interested entity. The notified entity may receive the notification and then act to take a course of action in response to the notification. A course of action may include stopping the transfer of the incoming funds associated with the received payment information, notifying a regulatory agency (if required or desired), seizing the payment funds, and notifying the account owner so that they may seek an alternative form of payment. Other courses of action, including one, more, or none of the aforementioned actions, may be implemented in accordance with the present disclosure herein without departing from the scope hereof.

In some embodiments, the notification of an exception to the SOFUN verification process is provided by an email message. It should be appreciated by those skilled in the relevant art that the notification may be provided by other methods of communication such as, for example, a printed report, an electronic file transfer, etc. In some embodiments, the notification email message may include a hypertext link to a specific exception description. Selecting the hypertext link to the specific exception will, preferably, provide a detailed presentation of why the associated SOFUN verification is invalid. In some embodiments, the exception notification is provided to allow the notified entity to respond to the exception notification in a timely and appropriate manner. Such a response may include, inter alia, re-submitting the invalid received payment information to the SOFUN verification process, canceling the transfer of payment funds, further processing of the payment information in an attempt to reconcile the invalid SOFUN verification exception, and combinations thereof.

Figure 7A:
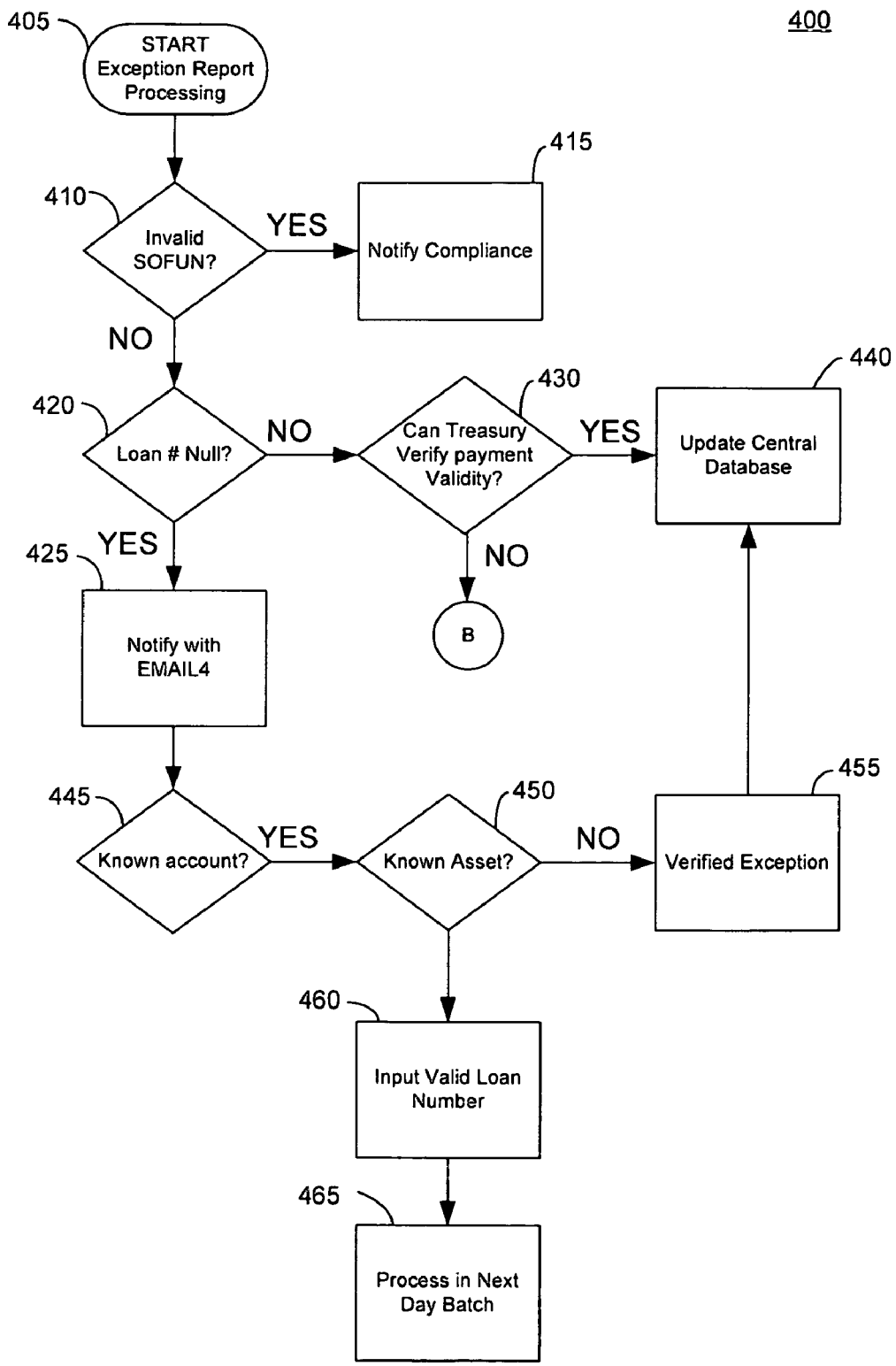
FIGS. 7A and 7B are flowcharts of a process of reporting an exception regarding a source of funds verification, in accordance with some embodiments herein.
Figure 7B:
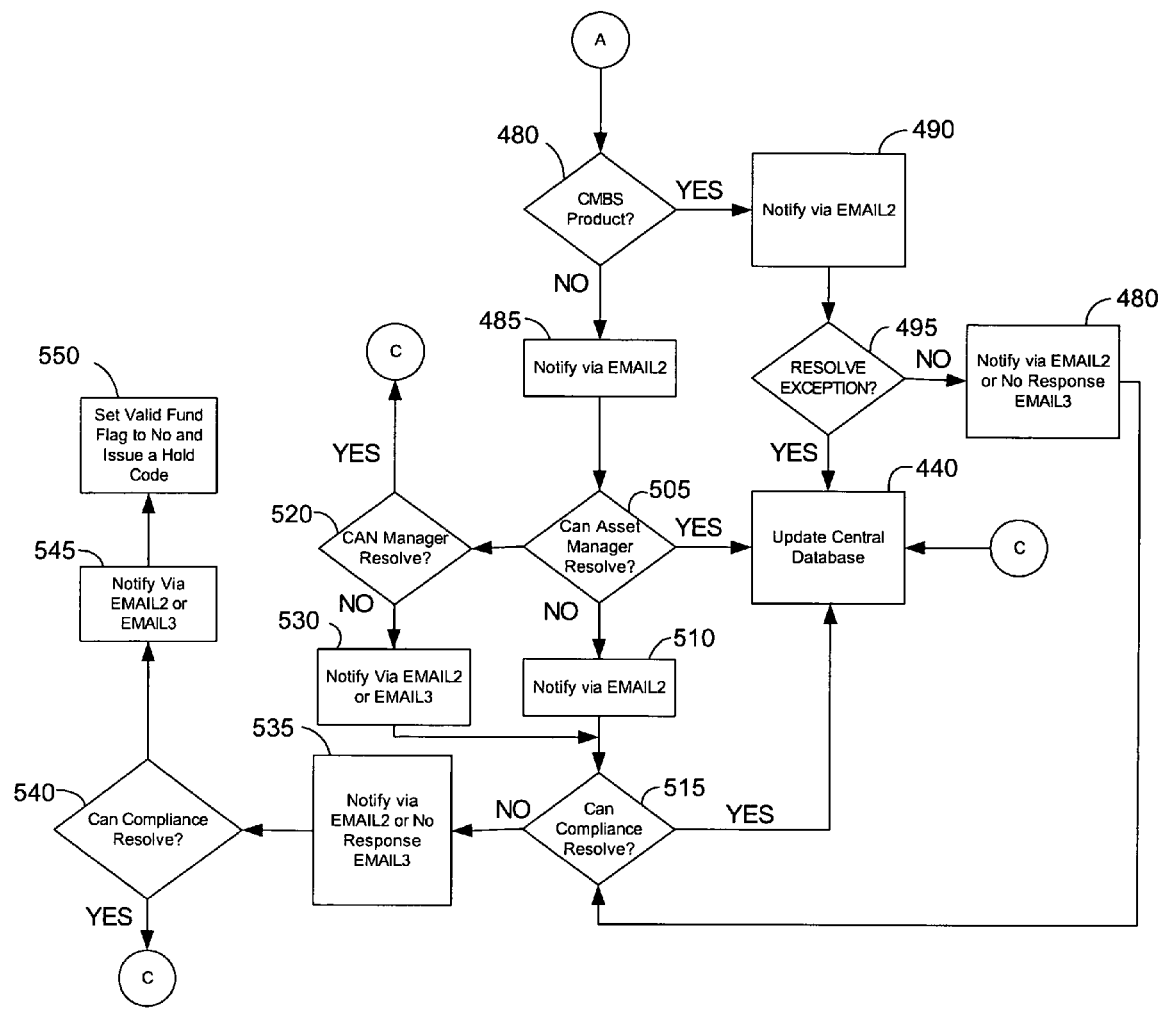

Referring to FIGS. 7A and 7B, there is shown an exemplary exception processing process, generally referenced by numeral 400. Exception processing starts at 405. At 410, process 400 verifies that the SOFUN verification process in fact declared the source of funds as invalid. If the SOFUN verification is invalid, a notification is provided via electronic communication (e.g., a specific message format such as an email message referred to as "EMAIL1") to an interested entity 415 such as, for example, a compliance department.

At 420 is determination is made whether an account identifier (e.g., a loan number) is null. If the account identifier is null (i.e., missing or not readily identifiable), a notification of the null value for the loan number may be provided at operation 425 via electronic communication (e.g., an email message identified as "EMAIL4", a notification that the subject payment information is not valid based on the combination of minimum criteria at operation 335). In an instance the loan number is not null, a determination is made to determine if the loan number can be ascertained at operation 430.

In the event the loan number can be ascertained at 430, the loan number is obtained and the payment information is updated to include the obtained loan number at 440. The updated payment information may be stored in a database such as, in some embodiments herein, database 140. In the event the loan number cannot be ascertained at operation 430, process 400 proceeds to FIG. 7B.

From operation 425, process 400 proceeds to operation 445 where a determination is made whether the account referenced by the payment information subject to the SOFUN verification process is of a particular type. For instance, the payment information may include sufficient information to determine the account is a known type of account, at operation 445. If the payment information includes sufficient information to determine that the account is a particular, known type of account at 445, then process 400 proceeds to operation 450.

At 450, a determination is made to further determine if a unique account identifier (e.g., loan number) can be determined from the payment information of known account type. If a unique account identifier can be determined, then process 400 proceeds to 460 where the unique account identifier (e.g., loan number) is added to the payment information. At 465 the payment information, including the newly determined account number is provided for SOFUN verification (e.g., process 300) using the updated payment information that includes a loan number.

If a unique account identifier cannot be determined at operation 450, then process 400 proceeds to operation 455. At 455, an assessment is made that the account is not of a type having a known unique account identifier and the payment information is preferably updated to reflect as much at operation 440.

Referring to FIG. 7B and resuming at operation 480, process 400 continues with the exemplary excerption processing thereof to further determine or ascertain the particular exception and resolve the exception. Resolving the exception associated with payment information may allow for further SOFUN verification processing of the payment information. For example, operations 495, 505, 515, and 520 may each determine if the exception associated with a payment can be resolved. Each determination at 495, 505, 515, and 520 is preferably accomplished by an interested entity of the SOFUN verification process. In some embodiments, different entities make each of the different determinations at 495, 505, 515, and 520, with notification of subsequent determinations provided to the next entity in the SOFUN verification workflow hierarchy.

At operation 480, a determination is made as to whether the payment information references another particular type of account (e.g., as an illustrative example, a commercially backed security, CMBS). In the instance the determination at 480 determines that the payment information references a known type of account (e.g., a CMBS), process 400 proceeds to operation 490 to notify an interested entity via electronic communication (e.g., EMAIL2, the received incoming payment information is not recognized as a regular payment-must validate source of funds), proceeds to operation 495 to determine if a unique account identifier can be obtained based on the known account type determined at 480, and proceeds to operation 440 to update the payment information with the unique account identifier.

Referring to operation 495, if it is determined that a unique account identifier cannot be obtained based on the known account type determined at 480, then a notification is provided via electronic communication at 500. The notification may include an indication that the SOFUN verification for the subject payment information resulted in an exception (EMAIL2). Further, the notification at 500 may include an indication that the determination of operation 495 was not acted on or fully accomplished by an entity responsible for making the determination thereof in a timely manner (EMAIL3).

From operation 500, process 400 proceeds to operation 515 for further processing of the exception. In the instance the responsible entity for the determination at 515 can resolve the exception (e.g., determine the account type and account number), then the payment information is updated at operation 440.

In the instance that the responsible entity for the determination at 515 cannot resolve the exception, then process 400 proceeds to provide a notification to the next responsible entity in the workflow via electronic communication at 535. The notification may include an indication that the SOFUN verification for the subject payment information resulted in an exception (EMAIL2). Further, the notification at 535 may include an indication that the determination of operation 515 was not acted on or fully accomplished by an entity responsible for making the determination thereof in a timely manner (EMAIL3).

At operation 540, a further determination is made to determine whether a next responsible entity in the workflow can resolve the exception of the payment information. In the event that it is determined that the exception cannot be resolved, then process 400 proceeds to operation 545. At 545, a notification is provided via electronic communication to a responsible entity. The notification may include an indication that the SOFUN verification for the subject payment information resulted in an exception (EMAIL2) or an indication that the determination that operation 540 was not acted on or fully accomplished by an entity responsible for making the determination thereof in a timely manner (EMAIL3). At operation 550, the payment information is characterized as being invalid. A reporting of the invalidation of the payment information provided at 550 may be further reported to a central database, responsible entity, or other(s).

Referring back to operation 540, in the event that it is determined that the exception can be resolved, then process 400 proceeds to update the payment information at 440. The updating of the payment information may include updating the payment information in a database such as, for example, database 170.

Operations 505 and 520, as mentioned above, represent determinations in the exception processing depicted in exemplary process 400. The determinations provided at 505 and 520 may be responded to in a manner as shown in FIG. 7B.

It should be appreciated by one skilled in the art that while the exception processing of FIGS. 7A and 7B depicts numerous determinations (e.g., 420, 430, 450, 480, 495, 505, 515, 520, and 540), the various determinations may be accomplished, overseen, or directed by one or more responsible entities having an interest in the SOFUN verification exception processing. For example, subsequent determinations may be reported by electronic communication to entities having a greater responsibility, expertise, or authority to resolve a preceding determination.

In some embodiments, an account may be associated with more than one source of payment. Accordingly, in order to complete a SOFUN verification process for a particular account, the source of funds for each source of payment may have to be determined. That is, the source of funds verification methods disclosed herein may be executed for each payment or each portion of a payment for payments comprising more than one source of funds for a payment to an account.

In some embodiments, methods of the present disclosure may be embodied as an executable computer program or instructions. The methods or embodiment thereof in computer executable instructions may however be implemented in many different ways, using any of a number of programming techniques and programming languages executable by general-purpose hardware systems or dedicated controllers. Also, at least some of the various steps for the methods described herein are optional or can be combined or performed in one or more alternative orders or sequences without departing from the scope of the present disclosure. Accordingly, the present disclosure and the appended claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present disclosure has been described with respect to various embodiments thereof, those skilled in the relevant art will note that various substitutions may be made to those embodiments described herein without departing from the spirit and scope of the present disclosure.

What is claimed is:

1. A method for facilitating verification of a source of funds for payment to an account, comprising:

receiving pre-verified payment information associated with the account for a payment to the account, the pre-verified payment information verifying the account is an approved source of funds;

receiving a first indication of a payment for the account, the first indication of the payment including a source of funds for the payment;

determining a first determination to determine whether the source of funds for the payment is an approved source of funds by comparing the first indication of the payment for the account and the received pre-verified payment information;

determining the account is associated with more than one source of funds;

determining that each of the sources of funds for the payment is an approved source of funds by comparing the indication of the payment for the account and the received pre-verified payment information;

determining a second indication of the payment for the account, the second indication of the payment including a source of funds for the payment not received with the first indication of the payment;

determining a second determination to determine whether the source of funds for the payment is an approved source of funds by comparing the second indication of the payment for the account and the received pre-verified payment information; and providing, at least in an instance the source of funds for the payment is not an approved source of funds, a notification via electronic communication.

2. The method of claim 1, wherein the determining of the first and the second determinations is based, at least in part, on a rule, a regulation, or a policy regarding an approval of a source of funds.

3. The method of claim 2, wherein the rule, regulation, or policy is administered by a governmental entity, an industry association, an oversight entity, or any combination thereof.

4. The method of claim 1, wherein at least one of the first and second the indications of the payment is received from at least one of a banking lockbox account or a financial wire transfer.

5. The method of claim 1, further comprising determining whether the first and the second indications of the payment includes a plurality of criteria, the plurality of criteria being used in the determining of the source of funds.

6. The method of claim 5, wherein the plurality of criteria comprises a loan number, a bank identification number, a bank account number, and a bank account name.

7. The method of claim 1, further comprising determining the source of funds for the received indication of payment is in compliance with a know your customer policy.

8. A system for facilitating verification of a source of funds for payment to an account, comprising:

a memory; and a processor connected to the memory, the processor being operative to:

receive pre-verified payment information associated with the account for a payment to the account, the pre-verified payment information verifying the account is an approved source of funds;

receive a first indication of a payment for the account, the first indication of the payment including a source of funds for the payment;

determine a first determination to determine whether the source of funds for the payment is an approved source of funds by comparing the first indication of the payment for the account and the received pre-verified payment information;

determine the account is associated with more than one source of funds;

determine that each of the sources of funds for the payment is an approved source of funds by comparing the indication of the payment for the account and the received pre-verified payment information;

determine a second indication of the payment for the account, the second indication of the payment including a source of funds for the payment not received with the first indication of the payment:

determine a second determination to determine whether the source of funds for the payment is an approved source of funds by comparing the second indication of the payment for the account and the received pre-verified payment information: and provide, in the instance the source of funds for the payment is not an approved source of funds, a notification via electronic communication.

9. The system of claim 8, wherein the first and the second determination is based, at least in part, on a rule, a regulation, or a policy regarding an approval of a source of funds.

10. The system of claim 8, wherein at least one of the first and second indications of the payment is received from at least one of a banking lockbox account or a financial wire transfer.

11. The system of claim 8, wherein the processor is further operative to determine whether either one of the first and second indications of the payment includes a plurality of criteria, the plurality of criteria being used in the determining of the source of funds.

12. The system of claim 11, wherein the plurality of criteria comprises a loan number, a bank identification number, a bank account number, and a bank account name.

13. The system of claim 8, wherein the processor is further operative to determine the source of funds for the received indication of payment is in compliance with a know your customer policy.

14. An article, comprising:
a storage medium having stored thereon instructions that when executed by a machine result in the following:

receiving pre-verified payment information associated with the account for a payment to the account, the pre-verified payment information verifying the account is an approved source of funds;

receiving a first indication of a payment for the account, the first indication of the payment including a source of funds for the payment;

determining that a first determination to determine whether the source of funds for the payment is an approved source of funds by comparing the first indication of the payment for the account and the received pre-verified payment information;

determining the account is associated with more than one source of funds;

determining that each of the sources of funds for the payment is an approved source of funds by comparing the indication of the payment for the account and the received pre-verified payment information;

determining a second indication of the payment for the account, the second indication of the payment including a source of funds for the payment not received with the first indication of the payment;

determining a second determination to determine whether the source of funds for the payment is an approved source of funds by comparing the second indication of the payment for the account and the received pre-verified payment information: and providing, in the instance the source of funds for the payment is not an approved source of funds, a notification via electronic communication.

\* \* \* \* \*